United States Patent [19]

Pace et al.

[11] Patent Number: 4,716,510
[45] Date of Patent: Dec. 29, 1987

[54] AUTOMATIC RESTART CIRCUIT FOR A SWITCHING POWER SUPPLY

[75] Inventors: W. David Pace, Tempe; Wei C. Wang, Mesa, both of Ariz.

[73] Assignee: Motorola, Inc., Schaumburg, Ill.

[21] Appl. No.: 859,690

[22] Filed: May 5, 1986

[51] Int. Cl.⁴ .......................................... H02M 7/517
[52] U.S. Cl. ...................... 363/49; 323/901
[58] Field of Search .................. 323/901; 363/49

[56] References Cited

U.S. PATENT DOCUMENTS

| 4,263,645 | 4/1981 | Zallmer .............................. 363/49 |
| 4,288,831 | 9/1981 | Dolikian ............................. 363/50 |
| 4,563,733 | 1/1986 | Schlenk .............................. 323/901 |

OTHER PUBLICATIONS

Palmucci; "Switching Regulator Start-Up Circuit"; IBM Technical Bulletin, vol. 19, No. 3, Aug. 1976.

Primary Examiner—Patrick R. Salce
Assistant Examiner—Jeffrey Sterrett
Attorney, Agent, or Firm—Michael D. Bingham

[57] ABSTRACT

A pulse width modulation controller for use in low power current mode switching power supplies includes a unique internal fault timer that initiates restart for overload recovery. The fault timer is responsive to an overload condition for discharging a soft-start capacitor to initiate the restart sequence of the controller.

2 Claims, 3 Drawing Figures

AUTOMATIC RESTART CIRCUIT FOR A SWITCHING POWER SUPPLY

BACKGROUND OF THE INVENTION

The present invention relates to pulse width modulator controllers designed for switching power supplies and, more particularly, to a switching regulator designed for low power applications.

Pulse width modulator controllers for controlling switching power supplies are well known. In general, such controllers provide output pulses that are used to drive a semiconductor switch. The semiconductor switch is therefore switched on and off at the frequency of the pulses. The semiconductor switch can be connected in series with the primary of a transformer to which is applied a DC input voltage. During the time that the semiconductor switch is on current flows through the primary to induce current flow and a voltage to be developed across the secondary of the transformer. The output voltage developed across the secondary can be rectified and filtered to provide, for example, a low voltage power source to some load utilization means as understood.

A typical pulse width modulator controller comprises modulator control circuitry including a sawtooth oscillator coupled to a flip-flop for developing, in conjunction with logic and drive circuitry, output pulses to control the operation of the semiconductor switch. A pulse width modulator comparator and error amplifier are included in the modulator control circuitry which function together to provide means to adjust the output pulse width in response to varying load demand by receiving feedback inputs as is understood. Thus, after initiation of each output pulse, the output of the comparator is caused to switch to a level state after a predetermined interval for terminating the pulse. By controlling the time delay between the initiation of the output pulses and the switching of the output of the comparator in accordance with variations in the load power demand the output voltage is regulated.

Prior art controllers of the type described above work quite well when driven from a low impedance power source capable of suppling sufficient current thereto to meet load power demands. However, a problem can arise when such pulse width modulator controllers are operated in low power applications and are operated from a power source having a relatively high source impedance. An example of such an application is in low power digital telephones wherein the input power source to the telephone instrument is the battery supply of the telephone exchange which is supplied to the telephone via the subscriber loop (telephone lines). The resistance of the subscriber loop can be very high depending on the distance that the telephone is from the telephone exchange.

In the above described application the amount of power available from the telephone exchange to the controller located in the telephone is limited due to the high source impedance associated with the telephone lines. If the load power demand of the telephone circuitry increases beyond the power available, the input voltage supplied to the controller from the telephone exchange can decrease thereby further reducing the input power supplied thereto. It is possible in at least some prior art controllers used in this low power application to become latched to operate in this positive feedback mode with low input power being supplied thereto and low output power to the load until the latter is completely disconnected which is undesirable.

Hence, a need exists for an improved pulse width modulation controller suited for low power applications which does not suffer from the latching problems associated with prior art controllers.

SUMMARY OF THE INVENTION

Accordingly, it is an object of the present invention to provide an improved pulse width modulation controller.

It is another object of the invention to provide an improved pulse width modulation controller for use in low power applications.

Still another object of the invention is to provide an improved pulse width modulation controller designed for low power switching power supplies within digital telephones.

A further object of the invention is to provide a method and circuit for automatically restarting a pulse width modulation controller that becomes latched in a low input, low output condition.

In accordance with the above and other objects there is provided an improved pulse width modulation controller including modulator circuitry for providing output pulses at an output thereof wherein the modulator circuitry further includes a pulse width modulator comparator and error amplifier operating in conjunction to adjust the output pulse width in response to receiving feedback signals from utilization means coupled thereto whereby the output of the comparator is periodically switched to a high output level and soft-start circuit wherein the improvement comprises a circuit coupled between the output of the comparator and the soft-start circuit which is responsive to the output of the comparator not switching after a predetermined time interval for activating the soft-start circuit.

DETAILED DESCRIPTION OF THE INVENTION

Figure 1:
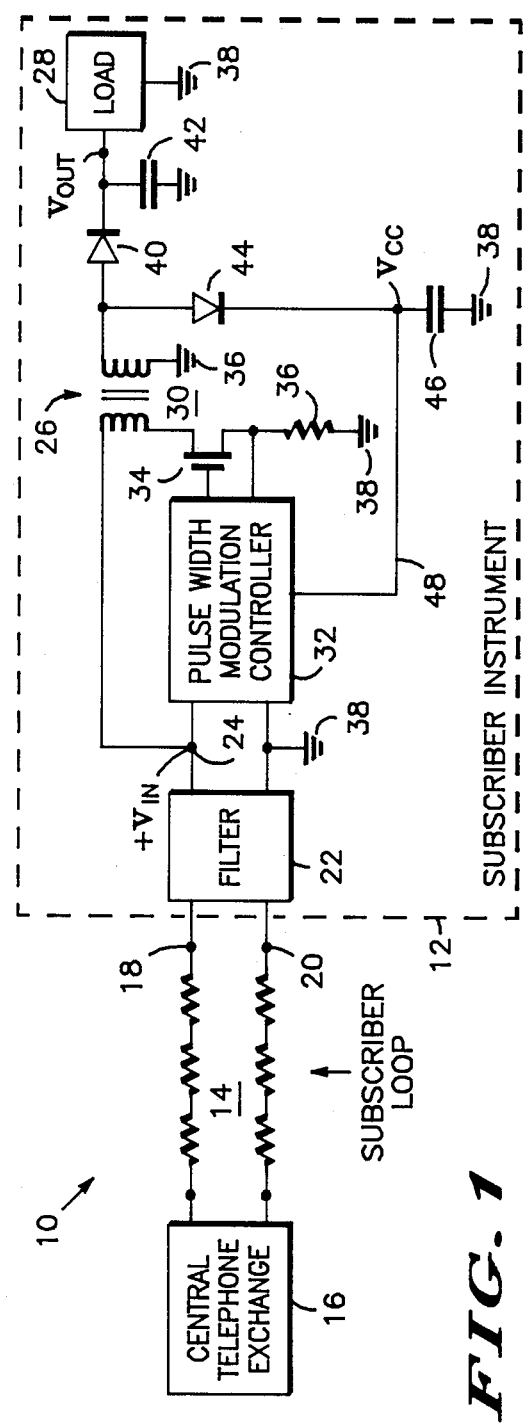
FIG. 1 is a partial block and schematic diagram illustrating the use of a pulse width modulation controller in a telephony system.

Turning now to FIG. 1 there is illustrated telephone system 10. System 10 includes a subscriber instrument 12 coupled via subscriber loop 14 to a central telephone exchange 16 as is understood. Central telephone exchange 16 provides, among other things, the power source to subscriber instrument 12. Typically a −48 volt battery supply is used in the telephone exchange for developing input power to the subscriber instrument 12 via the resistance of the subscriber loop (telephone lines). For simplification subscriber loop 14 is shown as including multiple resistors, corresponding to the impedance of the telephone line, connecting the telephone exchange 16 to subscriber instrument 12. Hence, the subscriber instrument 12 is operated from a power source supplied to terminals 18 and 20 that can have a relatively high impedance depending on the length of the telephone lines.

Subscriber instrument 12 which may be, for example, a low power digital telephone includes filter 22 for providing the DC voltage $V_{IN}$ at node 24 to switching power supply 26. Switching power supply 26 is transformer coupled via transformer 30 to load utilization means 28. As is generally understood, switching power supply 26 in conjunction with transformer 30 converts the relatively high voltage $V_{IN}$ to a lower DC rectified voltage $V_{OUT}$ to the input of load means 28. Load utilization means 28 may for instance be a CMOS voice/data transceiver which operates from a power supply voltage ($V_{OUT}$) of five volts.

Switching power supply 26 comprises pulse width modulator controller 32 which switches field effect transistor (FET) 34 off and on at a periodic rate. The source/drain of FET 34 is series coupled between the bottom of the primary of transformer 30 and sense resistor 36 to ground reference 38. $V_{IN}$ is supplied to the top of the primary winding at node 24. By switching FET 34 between its off and conducting states an AC voltage is developed across the primary winding of transformer 30 and is inductively coupled to the secondary thereof. Diode 40 rectifies the voltage produced in the secondary winding and in conjunction with filter capacitor 42 develops the DC voltage $V_{OUT}$ that is supplied to load utilization means 28. A DC feedback path comprising series connected diode 44 and capacitor 46 is supplied via lead 48 to switching power supply 26 to provide the operating potential to pulse width modulator controller 32 after circuit operation is established.

Figure 2:
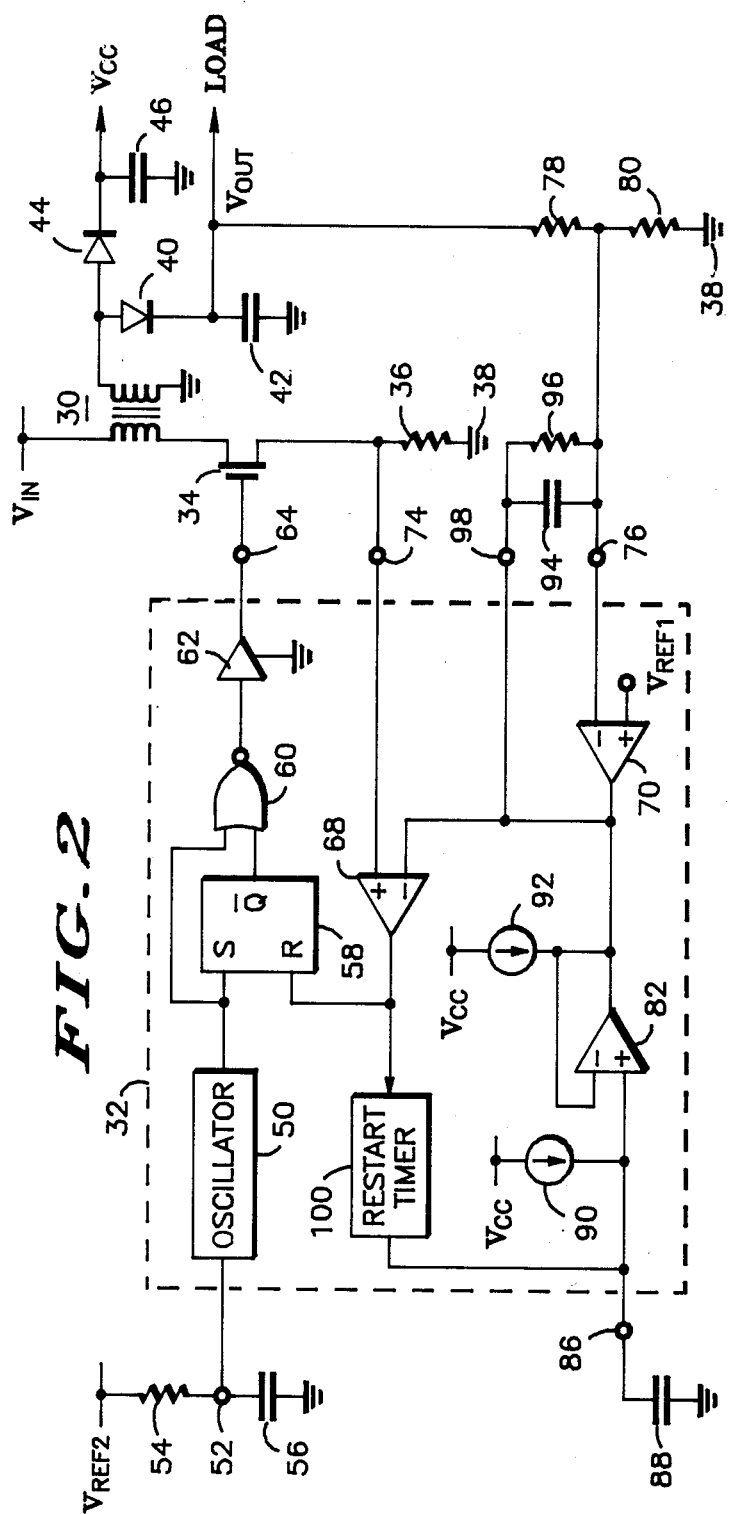
FIG. 2 is a partial block and schematic diagram of a pulse width modulation controller of the present invention designed for power supply control.

Referring to FIG. 2 a simplified schematic and block diagram of pulse width modulator controller 32 is shown. As indicated by the dashed outline, pulse width modulator controller 32 is suited to be manufactured in integrated circuit form. Controller 32 includes sawtooth oscillator 50 that is coupled at terminal 52 to the RC network including resistor 54 and capacitor 56 series connected between a voltage $V_{REF2}$ and ground reference 38. The output of oscillator 50 is coupled both to the set (S) input of flip-flop 58 and to one input of NOR gate 60. A second input to NOR gate 60 is connected to the Q output of flip-flop 58. The output of NOR gate 60 is coupled to drive amplifier 62 the output of which is coupled to the gate of FET 34 at terminal 64. NOR gate 60 and amplifier 62 comprise logic and gating drive circuitry for switching FET 34 between off and on operating states. The reset (R) input of flip-flop 58 is connected to the output of pulse width modulator comparator 68 which causes the flip-flop to be reset when the output of comparator 68 switches high, a first output level state. The inverting and non-inverting inputs of comparator 68 are coupled respectively to the output of error amplifier 70 and sense resistor 36 (at terminal 74). The inverting input of error amplifier 70 is coupled at input terminal 76 to the interconnection of series connected resistors 78 and 80 the latter of which are connected between $V_{OUT}$ and ground reference. The non-inverting input to error amplifier 70 is connected to a first reference voltage $V_{REF1}$. Pulse width modulation controller 32 further includes soft-start up circuitry comprising unity gain connected amplifier 82 the output of which is coupled to the inverting input of comparator 68. Amplifier 82 is connected in a wired-OR sink only configuration with amplifier 70 to comparator 68. The non-inverting input of amplifier 82 is connected at terminal 86 to capacitor 88 and to current source 90. Current source 92 is coupled both to the inverting input of buffer-amplifier 82 and the output thereof.

As so far described pulse width modulation controller is conventional and the operation thereof is understood. Hence, only a brief description of the operation of controller 32 is hereinafter provided. In normal operation sawtooth oscillator 50 provides an output pulse to NOR gate 60 causing the output thereof to go low. The output of amplifier 62 therefore is low which turns off FET 34 at the initiation of each pulse cycle Flip-flop 58 is also put into a set condition where the $\overline{Q}$ output is set low. At the termination of the pulse from oscillator 50, both inputs of NOR gate 60 being low, the output of NOR gate 60 goes high which produces a corresponding high voltage output at the output of amplifier 62. FET 34 is thus turned on and current is sourced therethrough which ramps up in value due to the transformer. The current through FET 34 continues to ramp up until the voltage developed across sense resistor 36 exceeds that supplied to the inverting input of comparator 68. At such time the output of comparator switches to a high output state to reset flip-flop 58. Resetting of flip-flop 58 causes the $\overline{Q}$ output to go high forcing the output of NOR gate 62 low. Thus FET 34 is switched off. A switched AC voltage is therefore developed across transformer 30 which is rectified and filtered by diode 40 and capacitor 42 to provide $V_{OUT}$ to the load.

Regulation is provided through the feedback supplied to the inverting input of amplifier 70 at the interconnection of resistors 78 and 80 to adjust the peak current flow through FET 34 during each subsequent cycle. For example, as the load requires more operating current $V_{OUT}$ will decrease. This causes the voltage at terminal 76 to decrease which in turn causes the output of amplifier 70 to increase. Since the voltage at the inverting input of comparator 68 rises as the output of error amplifier 70 increases, the next time that FET 34 is turned on by oscillator 50 the current flow therethrough is allowed to ramp up to a higher value until the voltage developed across resistor 36 equals the increased reference voltage supplied to the inverting input of comparator 68. Hence more current is supplied to the load via as more current is allowed to ramp through transformer 30. The opposite regulated action is also true, i.e., if the load requires less current, $V_{OUT}$ will increase to lower the reference voltage at the inverting input of comparator 68. This will cause the output of comparator 68 to trip sooner to thereby decrease the current flow through FET 34 on the next cycle of operation.

The soft start circuit permits slow turn on of pulse width modulation controller 32. Hence, at initial turn on of the system capacitor 88 is discharged which keeps the output of buffer amplifier 82 in a low state. This prevents the output of amplifier 70 from effecting circuit operation since whichever of the two amplifiers that has a lower output controls. With the inverting input thereto low comparator 68 will keep flip-flop 58 in a reset state. As capacitor 88 is linearly charged by current source 90 the output of amplifier 82 rises linearly as does the inverting input of comparator 68. The output of comparator is allowed to be switched between low and high output states to gradually allow the current to ramp up through sense resistor 36 as FET 34 is switched between operating states.

Capacitor 94 and resistor 96 which are coupled between terminals 76 and 98 are used to set the feedback gain of the feedback loop as is understood.

As described above the operation of pulse width modulation controller is known. However, if controller 32 is operated from a power source with relatively high source impedance (such as a telephone line) a latch condition can occur when the output is overloaded. Hence, as the power supplied to load 28 increases the input voltage $V_{IN}$ decreases due to the voltage drop across the source resistance (the subscriber loop, FIG. 1). If the load power demand should increase beyond the maximum available power to the controller a positive feedback mode is entered wherein the $V_{IN}$ is caused to collapse to a minimum value. For example, as switching power supply 26 tries to maintain a regulated $V_{OUT}$ across load 28 a latch condition will arise if the load demands excessive current to be supplied thereto. In this overload condition the value of $V_{OUT}$ will drop since the value of $V_{IN}$ has decreased because of the increased voltage drop across subscriber loop 14 thereby decreasing the voltage across resistor 80. The output of error amplifier will rise to keep the output of comparator 68 from switching to a high level state. Hence, FET 34 remains on longer as there is insufficient voltage on the primary of transformer 30 to permit the current to ramp to a value to develop a voltage across resistor 36 sufficient to switch the output of comparator 68. Pulse width modulation controller 32 will remain in this latched condition without some means for interrupting the load from the power supply in order to allow $V_{IN}$ to increase.

To prevent the above described latch condition from occurring fault timer and restart circuit 100 of the preferred embodiment is placed between the output of comparator 68 and capacitor 88 of the soft start circuit.

Restart timer 100 detects the above described overload condition and momentarily decreases the on time of FET 34 to allow the input voltage $V_{IN}$ to return to its maximum value. Restart timer 100 measures the time interval between the switching of the output state of comparator 68. When this time exceeds a preset interval timer 100 discharges soft-start capacitor 88 to initiate a restart sequence. When capacitor 88 is discharged soft start buffer amplifier 82 pulls the inverting input of comparator 68 to ground reference. The output of comparator 68 is switched high to turn off FET 34 as previously described. In turn restart timer 100 is inactivated to permit capacitor 88 to begin to slowly charge. The voltage at the inverting input of comparator 68 slowly increases as capacitor 88 charges. This permits the voltage developed across resistor 36 to slowly increase as the output of comparator is switched between low and high output states. Thus, lowering the voltage to comparator amplifier 68 reduces the current in the transformer primary allowing the input voltage $V_{IN}$ to increase. If the overload condition has been removed, controller 32 will return to normal operation.

Figure 3:
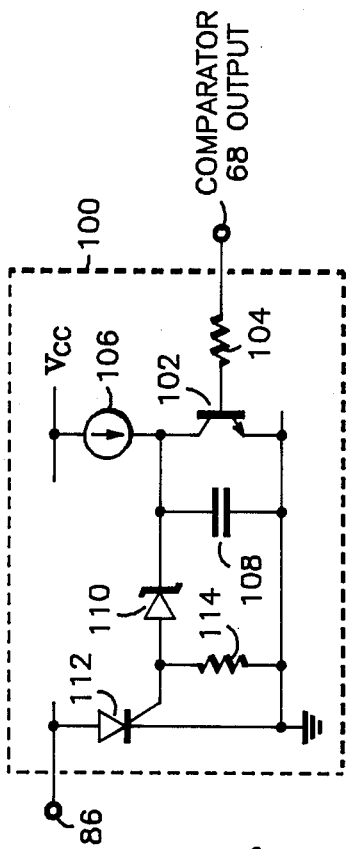
FIG. 3 is a schematic diagram of a restart and fault timer of the present invention.

Referring to FIG. 3 there is shown a circuit for providing the described timer restart function. Timer 100 includes NPN transistor 102 the base of which is coupled via resistor 104 to the output of comparator 68. The collector-emitter conduction path of transistor 104 is coupled between current source 106 and ground refersence 38. In normal operation of controller 32 transistor 102 is turned on as the output of comparator 68 goes high to discharge capacitor 108 that is coupled across the collector and emitter thereof. Thus the breakdown voltage of Zener diode 110 is never exceeded and SCR 112, which has the gate thereof connected to the anode of diode 110 is never turned on. However, if the preset time interval is exceeded due to an overload condition, capacitor 108 is charged by current source 106 wherein a voltage is developed thereacross that exceeds the breakdown of Zener 110. Zener diode 110 is then rendered conductive to source current through resistor 114 to turn on SCR 112. When SCR 112 turns on capacitor 88 is discharged to initiate the restart condition. When SCR 112 has completely discharged capacitor 88, the SCR will conduct only the current from current source 90. Since the current from current source 90 is less than the required SCR holding current (determined by resistor 114) SCR 112 will then sWitch off after capacitor 88 is completely discharged. This allows capacitor 88 to be recharged via current source 90 which gradually restarts the pulse width controller modulator.

Hence, what has been described above is a novel pulse width controller having a fault detector and restart timer circuit for sensing an overload condition to prevent the controller from latching into an undesirable operation state.

We claim:

1. In a pulse width modulation controller including modulator circuitry for providing output pulses at an output thereof to utilization means, the modulator circuitry including a comparator and an error amplifier operating in conjunction to provide output pulse width modulation by causing the output of the comparator to periodically switch from a first level state to a second level state and soft start circuitry coupled with the comparator for providing slow start up of the controller, the soft start circuitry including a first capacitor, the improvement comprising circuit means coupled between the output of the comparator and the soft start circuitry for activating the soft start circuitry to initiate a restart of the controller whenever the output of the comparator does not switch to the second level state within a preset time interval wherein said circuit means includes;

a second capacitor;
   means for charging said second capacitor;
   first semiconductor switch means responsive to the output of the comparator output being switched to said second level state for discharging said second capacitor; and
   second semiconductor switch means responsive to said second capacitor being charged to a predetermined level when the output of the comparator does not switch within said preset time interval for discharging the first capacitor whereby the restart of the controller is initiated.

2. The controller of claim 1 wherein said second semiconductor switch means is latched to an on state to discharge said first capacitor therethrough and is automatically turned off when said first capacitor is discharged to allow said first capacitor to initiate said restart of the controller.

* * * * *